Nov. 17, 1959   R. A. REHBERG ET AL   2,912,949
BASE SHELL PIN FORMING MACHINE
Filed April 4, 1956   6 Sheets-Sheet 1

INVENTORS
R. A. REHBERG
W. J. WILLIAMS
ATTORNEY

Nov. 17, 1959     R. A. REHBERG ET AL     2,912,949
BASE SHELL PIN FORMING MACHINE

Filed April 4, 1956     6 Sheets-Sheet 3

INVENTORS
R. A. REHBERG,
W. J. WILLIAMS.
BY
ATTORNEY.

United States Patent Office 2,912,949
Patented Nov. 17, 1959

2,912,949

BASE SHELL PIN FORMING MACHINE

Richard A. Rehberg, Livingston, and William J. Williams, Bloomfield, N.J., assignors to Westinghouse Electric Corporation, East Pittsburgh, Pa., a corporation of Pennsylvania Application April 4, 1956, Serial No. 576,174

7 Claims. (Cl. 113—1)

The present invention relates to apparatus for the manufacture of incandescent and photoflash lamps and, more particularly, to a machine for forming a plurality of socket positioning pins on the base shell.

In the past, the base shell, suitably brass, was provided, as by piercing, with diametrically opposed pin mounting holes. Solid brass pins were then mounted in the holes and a tool inserted within the base for use as an anvil to stake the inner end of each pin, while the outer portion of the pin was pushed into position. The diametrical pin alignment, pin mounting height, and pin projection length (in order to satisfactorily fit into, and remain in, photoflash lamp gun sockets) must be restricted to closed tolerances, such as ±.003″. This pin inserting method was expensive because of the low production rate and the added cost of material involved.

Hence, it has been found advantageous according to our invention to provide an automatic base pin forming machine capable of high speeds, such as three hundred sixty formed shells per minute, and which eliminates shell-piercing, pin inserting into said shell and poor pin contact to said shell. Our pin forming machine comprises a novel endless chain type conveyor provided with a plurality of nests, such as forty-one, supported by pivoted end members, such as sprockets, and appropriate guides mounted on the frame and suitably intermittently indexed by a conventional indexing mechanism through a like number of work stations. At the pin forming stations the nests are guided into an elevating mechanism, are lifted off the conveyor to a position adjacent the base shell pin forming die assembly for the forming of the pins and then returned to the conveyor chain. Our pin forming machine is adapted for dual operations of base shell loading, pin forming and base shell unloading on each side of the conveyor.

Each side of the pin forming machine is provided with a loading mechanism comprising a vibratory feeder for vibrating the base shells around a spiral bowl track and into a gravity feed tube for delivery to an escapement mechanism; a shell turnover for delivering all base shells oriented with their contact ends down and a base loader for delivering the shells, three at a time into a conveyor nest, at stations "1" and "2." The shells may be detected by an inspection detecting mechanism at stations "3" and "24" for misshape, scrap material or slivers therein. At stations "4" and "25" the defective shells may be ejected from the loaded nest. At stations "6" and "27," the first base shell pin forming stations, each shell is provided with oppositely disposed flat filleted (segmental spheroidal) dimples. At stations "8" and "29" the second base shell pin forming stations, each of the dimples is deepened and compressed into a generally hemi-spherical shape. Each dimple is then coined by a base shell pin forming punch and die assembly into a further deepened generally cylindrical shape at stations "10" and "31," the third pin forming stations. At stations "12" and "33," the last pin forming stations, the formed pins are flattened. At stations "14" and "35" the finished base shells may be removed from the base shell pin forming machine by an unloader, similar for example to the defective shell ejector unit at stations "4" and "25."

In its general aspect the present invention has as its objective a machine for forming a plurality of protuberances on a metallic part and eliminating part piercing, protuberance inserting and protuberance staking thereto.

A specific object of the present invention is a machine for forming a plurality of locating pins on a metallic part by first forming oppositely disposed flat segmental spheroidal dimples in said parts, elongating said dimples into a deepened generally hemispherical shape, coining generally cylindrical dimples, and flattening said dimples to form the pins.

A further object is an endless chain type conveyor for a base shell pin forming machine adapted to carry a plurality of part receiving nests which are indexable from station to station and which are reciprocable vertically from the conveyor to the base shell pin forming die assemblies.

Other objects of the present invention will become apparent to those skilled in the art to which it appertains as the description and recitation thereof proceeds.

Referring now to the drawings in which like numerals of reference indicate similar parts throughout the several views:

Fig. 5 is perspective view of an individual link of the conveyor chain.

Figure 1:
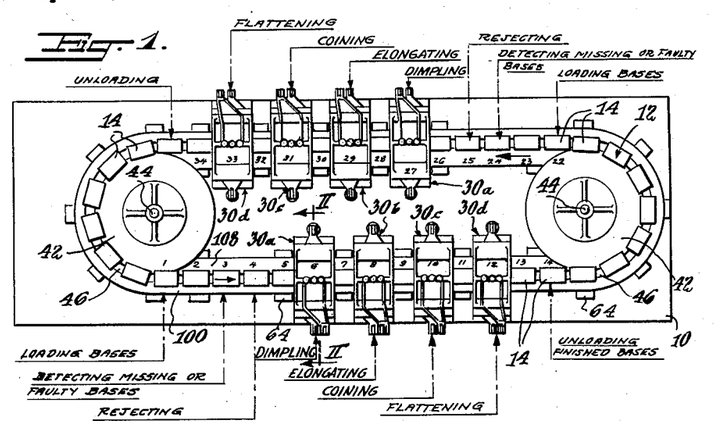
Fig. 1 is a plan view of the base shell pin forming machine of the invention.

Referring now to the drawings the base shell pin forming machine of the invention has a frame 10 comprising (Figs. 1, 2, 3, 4, and 8) horizontal members integrated by horizontal cross members (to form the table top) and legs (not shown) upstanding from the floor and attached to the table top. A conveyor 12 is provided with a plurality of base shell nests 14 (forty-one in the showing of Fig. 1) each of which accommodates a plural number of base shells. The nests are indexable about a plurality of work stations adjacent the conveyor 12 by a conventional indexing mechanism (not shown) but of the type shown in U.S. Patent No. 2,439,884, issued April 20, 1948 to J. M. Campbell. The indexing mechanism is associated with a main cam shaft 122 of the pin forming machine (Figs. 7 and 8) which shaft is driven by a motor (not shown).

Figures 2, 3, 17:
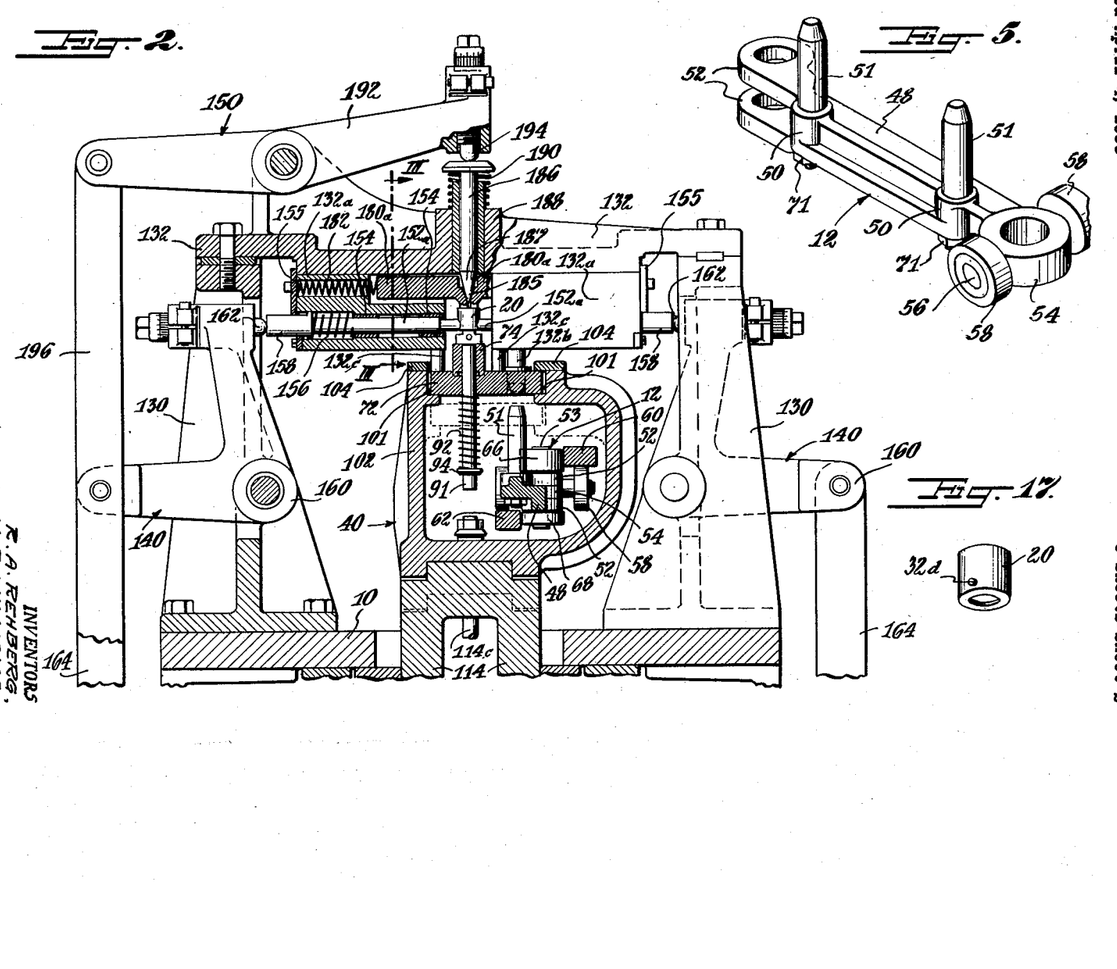
Fig. 2 is a vertical sectional view of the first pin forming punch and die head or dimpling assembly at stations "6" or "27" of the pin forming machine of Fig. 1 along the lines II—II of Fig. 1, in the direction of the arrows and showing the position of the parts immediately after the base shells have arrived opposite the retracted punches and female dies.
Fig. 3 is a fragmentary vertical sectional view of the pin forming punch and die head or dimpling assembly of Fig. 2 along the lines III—III of Fig. 2 in the direction of the arrows.
Fig. 17 is a perspective view of a base shell showing one of the oppositely disposed pins formed by the machine of the invention.
Figures 6, 7:
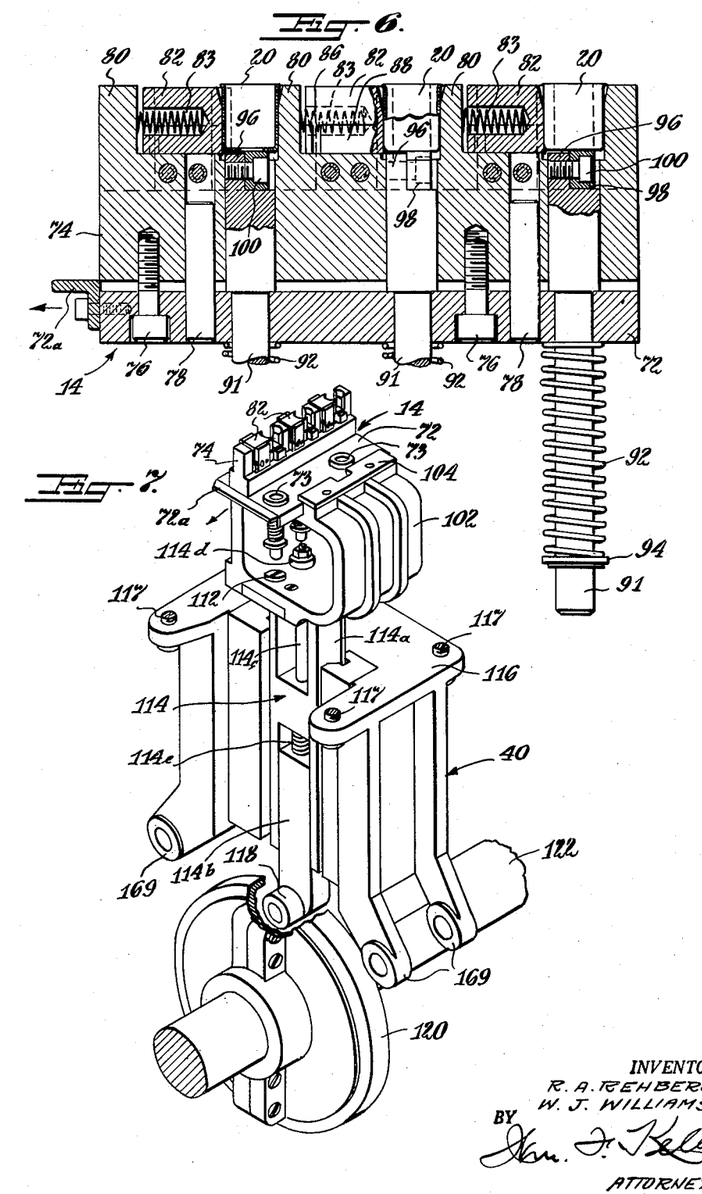
Fig. 6 is a vertical sectional view of a base shell nest on lines VI—VI of Fig. 4 in the direction of the arrows and showing the details thereof.
Fig. 7 is a perspective view of the head elevating or nest lifting mechanism at a pin forming station and showing the nest in its uppermost position.
Figure 12:
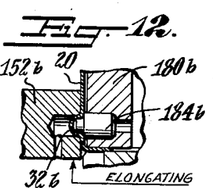
Fig. 12 is a view similar to Fig. 11 showing the position of one of the female dies, base shell, and one of the male punches at the end of the second pin forming or elongating operation at stations "8" and "29."

Each side of the pin forming machine is provided with a loading mechanism (not shown) for delivering base shells 20 (Fig. 17), three at a time (in the showing of Figs. 6 and 7) to a conveyor nest 14, at stations "1" and "22"; an inspection mechanism (not shown) at stations "3" and "24" for detecting misshape thereof and scrap material and slivers therein. At stations "4" and "25" a base shell ejector unit (not shown) may eject defective shells from the loaded nest 14. At stations "6" and "27," the first pin forming stations, a first base shell pin forming punch and die or dimpling assembly 30a provides each shell 20 with oppositely disposed flat filleted dimples 32a (Fig. 11) having the shape of a segment of a sphere. At stations "8" and "24," the second pin forming stations, a second base shell pin forming punch and die or elongating assembly 30b deepens and compresses each of the dimples 32a into a generally hemispherical shape 32b (Fig. 12). Each dimple 32b is then coined by a third base shell pin punch and die or coining assembly 30c into a further deepened, generally cylindrical shape 32c (Fig. 13) at stations "10" and "31," the third pin forming stations. At stations "12" and "33" the formed pins 32c (Fig. 14) are flattened by a fourth pin forming punch and die of flattening assembly 30d. It will be understood that at each of the above mentioned pin forming stations the base shell nest 14 is raised to the level of the tooling by a nest lifting mechanism 40 (Figs. 2 and 7). At stations "14" and "35" the finished base shells (Fig. 17) may be removed from the base shell pin forming machine by an unloader (not shown).

Conveyor

Figures 3, 4:
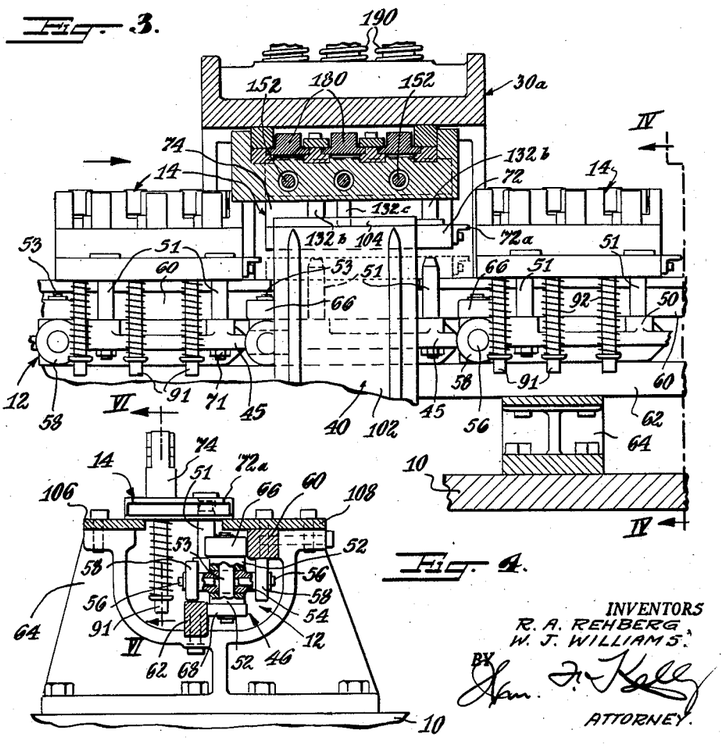
Fig. 4 is a vertical sectional view of the pin forming die head or dimpling assembly along the lines IV—IV of Fig. 3 in the direction of the arrows and showing the details of the support for the conveyor chain and for the base shell nests while they are between stations and in their lowermost position.

The conveyor 12 (Figs. 1, 2, 3, 4, and 5) of the base shell pin forming machine of the invention comprises a pair of pivoted members, such as the sprockets 42 (Fig. 1) rotatable on shafts 44 journalled on the frame 10 and motivated by the above mentioned conventional drive or indexing mechanism (not shown) and a continuous endless member, such as the chain 46 passing around and supported by the sprockets 42. The chain 46 consists of a plurality of interlocking links 48 for supporting the nests 14 (Fig. 5). Each link 48 is provided at each end with hubs 50 for mounting therein head guide pins 51, a pair of registering lugs 52 at one end in spaced bifurcated relation to each other for a receiving link connecting pin 53 (Fig. 3) and a single lug 54 at the other end, adapted to register with the lugs 52 of the next adjacent interlocking link 48. Each lug 54 (Fig. 5) has stub roller shafts 56 on which are carried guide rollers 58. These rollers 58 (Figs. 2 and 5) ride on the underside and on the top (when viewed in Fig. 2) of an upper cam track 60 and a lower cam track 62 respectively (Fig. 4). The tracks 60 and 62 are secured to the frame 10 by means, such as brackets or castings 64 (Figs. 3 and 4) and prevent vertical reciprocation of said conveyor chain 46. As shown in Fig. 2, the lugs 52 and 54 of adjacent links 48 are interlocked by a connecting pin 53 which also carries a top roller 66 and a bottom roller 68 for engagement respectively (when viewed in Fig. 2) with the left hand side of top track 60 and the right hand side of bottom track 62, thus preventing lateral displacement of the chain 46. This above described link construction confines each link 48 in every direction except the normal direction of indexing travel. The nest guide pins 51 (Fig. 5) are upstanding from the hub portions 50 of the link 48 and are secured therein, as by a nut 71, in threaded engagement therewith.

Nests

Figure 18:
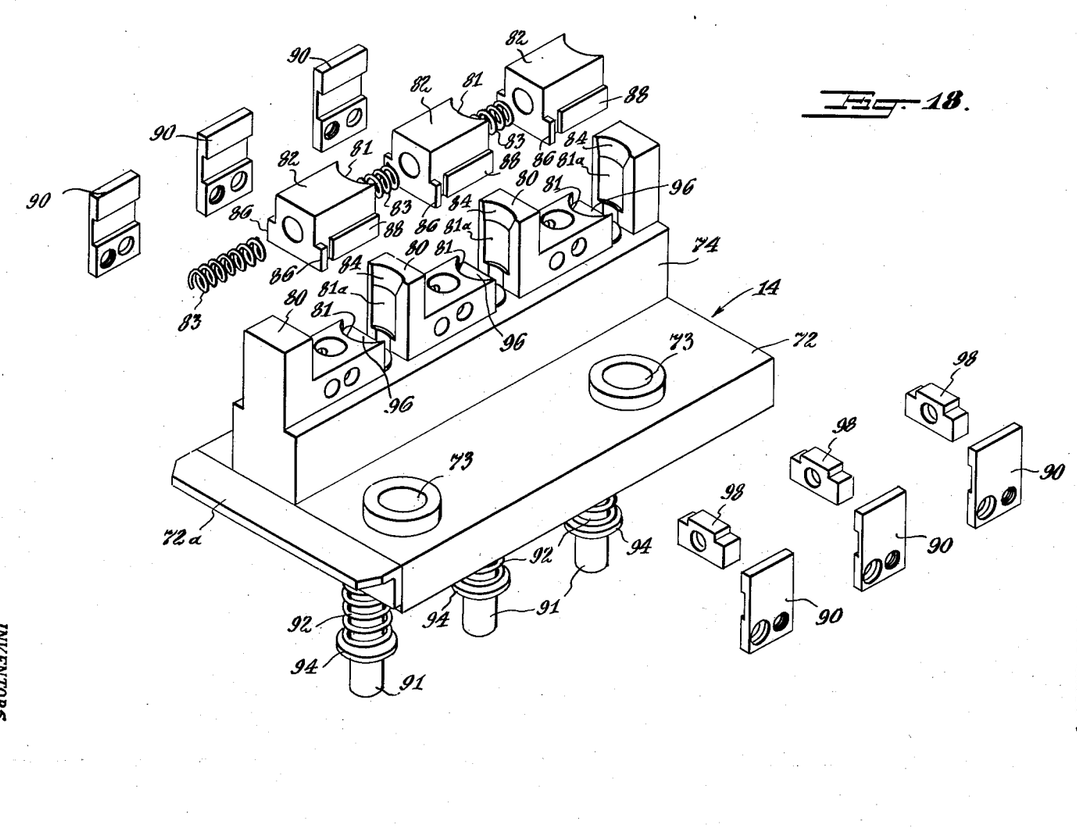
Fig. 18 is an enlarged exploded perspective view of a base shell nest and showing more clearly the details of its construction.

Each of the base shell nests 14 (Figs. 1, 2, 3, 4, 6, 7 and 18) has a nest plate 72 provided with a forward guard lip 72a to prevent shells 20 from lodging between adjacent nest plates 72. The plates 72 are reciprocable by means of bushings 73 therein on the link guide pins 51. A nest block 74 is upstanding from said nest plate 72 and is secured thereto, as by screws 76 and locating pins 78 (Fig. 6). The nest block 74, which is of a generally inverted T-shape, as can be seen in Fig. 18, is provided with a plurality of L-shaped lugs or nest portions 80 disposed in longitudinal spaced relation to each other, there being three such lugs 80 in the present showing of Fig. 18. A movable jaw block 82, biased by a spring 83, is reciprocable on the horizontal leg of the L-shaped nest portion 80 and has a base shell receiving contour 81 (Fig. 18) provided on its leading face. As shown in Fig. 18 a registering base shell receiving contour 81a is provided as a fixed jaw 84 in the rear vertical face of the next adjacent L-shaped nest portion 80. The spring 83 is contained in a suitable hole in the movable jaw block 82. The block 82 (Fig. 18) carries a stop 86 and a slide guide 88, on each side thereof. The guides 88 engage and slide in stop plates 90 which are secured to the side walls of the nest portion 80, as by screws.

A plurality of ejector pin holes (Figs. 6 and 18) are provided in the nest block 74 and nest plate 72 between succeeding nest portions 80 and register with the cylindrical recess formed by the mating shell contour surfaces 81 and 81a. An ejector pin 91 (Figs. 2, 6, 18) has an upper portion slidable in each of the ejector pin holes provided in the nest block 74, and a lower smaller diameter portion (Fig. 6) slidable in each of the similar holes provided in the nest plate 72. Thus the top surface of the nest plate 72 acts as a stop against the shoulder formed between upper and lower sections of each ejector pin 91 thus limiting their downward movement. A spring 92 is provided on each pin 91 between a lower snap ring collar 94 (Figs. 2 and 6) and the bottom of nest plate 72. In addition each ejector pin 91 has its upper end machined into a semi-cylindrical shape 96 for securement thereon of an ejector key 98 as by means of a screw 100 (Fig. 6). The key 98 (Figs. 6 and 18) spans the outside diameter of an incorrectly inserted base shell 20. Each ejector pin 91 is engageable, for example, by an operating rod of an ejecting mechanism (not shown) at stations "4," "14," "25" and "35" and can be moved upwardly in the ejector pin holes to push a base shell 20 from between the movable jaw contour 81 and the fixed jaw contour 81a.

Each nest plate 72, while at the pin forming stations "6," "8," "10," "12," "27," "29," "31," and "33," rests in matching ledges 101 (Fig 2) provided in a nest elevating mechanism elevating head 102 of the nest lifting mechanism 40. Plates 104 (Fig. 2) secured to the elevating head 102, as by screws, retain the nest plate 72 in the head 102.

Between pin forming stations and adjacent to the other stations around the periphery of the conveyor 12, the nest plate 72 is slidable on (Fig. 4) guides 106 and 108. These guides 106 and 108 are supported by the castings 64 which are secured, as by screws, to the table top of the frame 10.

Nest lifting mechanism

Each of the nest lifting mechanisms 40 at the pin forming stations, stations 6, 8, 10, 12, 27, 29, 31, 33 (Figs. 2, 3, 4 and 7) has its lifting head 102 secured, as by screws 112, to an upper portion 114a of a compound lift slide 114, which in turn is reciprocable (Fig. 7) in a slide guide bracket 116. To prevent damage to the elevating mechanism 40 and to protect the tooling in case the elevating head 102 strikes an obstruction, the compound lift slide 114 has the upper portion 114a slidable in the bracket 116 and a lower portion 114b slidable in said upper portion 114a (Fig. 7). The lower portion 114b carries an axial rod 114c which is slidable in both the upper portion 114a and the elevating head 102. A suitable washer nut 114d (Fig. 7) on the upper threaded end of the rod 114c normally rests on the elevating head 102 and is held thereat by a spring 114e about the rod 114c between the lower portion 114b and the upper portion 114a. The guide bracket 116 may be secured to the frame 10, as by bolts 117 (Fig. 7). A cam roller 118 carried or pivoted on the lower portion 114b of the slide 114 (Fig. 7) is engageable in a box type lifting cam 120, on the main cam shaft 122 of the pin forming machine.

As a nest 14 indexes into a pin forming station the nest plate 72 (Figs. 3, 7 and 18) is guided into the lifting head 102 and is held therein by the ledges 101 and the plates 104. When the roller 118 engages a raised portion of the lifting cam 120, the slide 114 and the lifting head 102 of the nest lifting mechanism 40 (and the nest 14 secured in the lifting head 102) are moved upwardly from the dotted line position shown in Fig. 2 to the solid line position shown in Fig. 2. The three base shells 20 held in the nest portions 80 of the nest block 74 are properly positioned, as hereinafter explained, as shown in Fig. 2 adjacent for example, the first pin forming or dimpling mechanisms 30a at stations "6" and "27."

Pinforming mechanism

Figure 8:
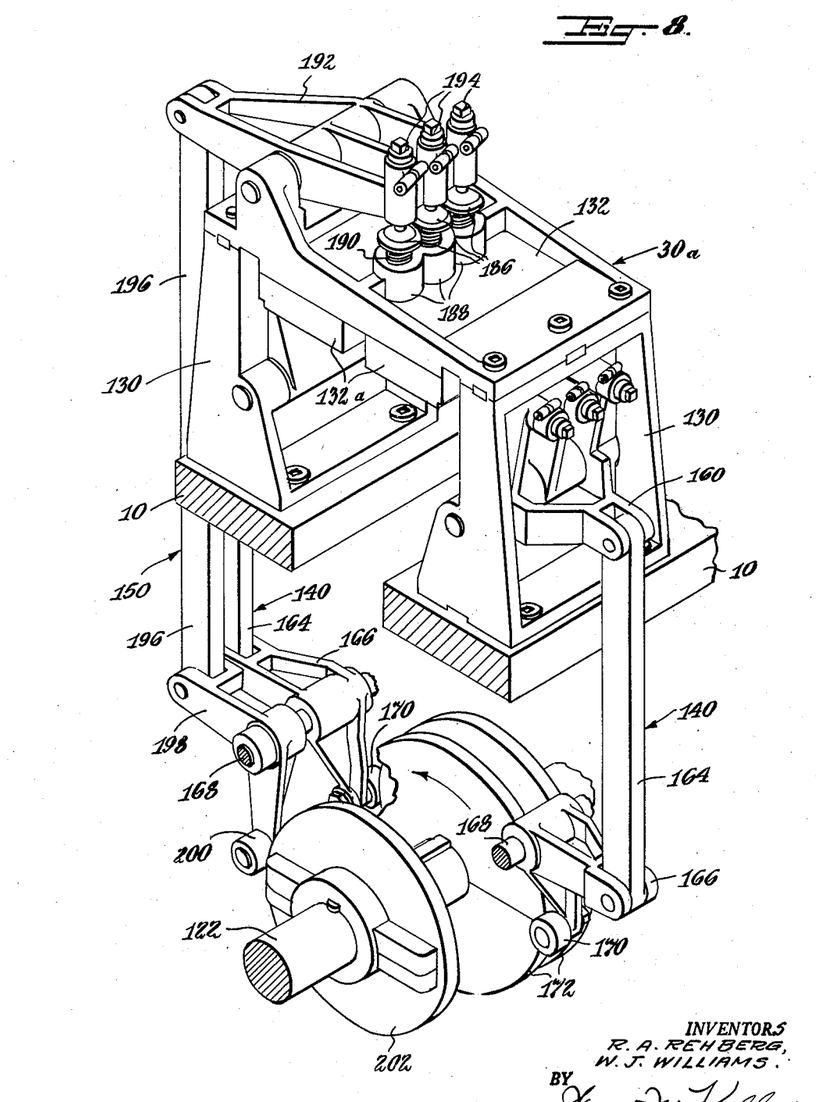
Fig. 8 is a perspective view of the pin forming punch and die head or dimpling assembly and showing its associated female die reciprocating mechanism and male punch reciprocating mechanism.

Each of the pinforming mechanisms 30a, 30b, 30c, and 30d (Fig. 1) have a pair of upstanding mounting brackets 130 (Figs. 2 and 8) secured by their bottom flanges, as by screws, to the table top of the frame 10 and integrated at the top by a bridge 132, suitably bolted thereto (Fig. 8). Each pinforming or dimpling mechanism 30a, for example, has a pair of female die reciprocating or operating mechanisms 140 mounted on the brackets 130 and reciprocable in the bridge 132 as hereinafter explained; and a pair of male punch reciprocating or operating mechanisms 150, which are reciprocable in the bridge 132 along the path of reciprocation of said female operating mechanisms 140.

The bridge 132 supports a pair of depending tool blocks 132a on the underside thereof (Figs. 2, 3, 8, 9 and 15). An alignment pin 132b (Fig. 2) depends from each of the blocks 132a and has a frusto-conical lower end for guidingly locating the nest 14 in relation to the pin forming tools. It will be understood that there is a small amount of clearance, for example, about 3/32", between the frusto-conical upper portion of each of the guide pins 51 and the frusto-conical lower portion of its registering alignment pin 132b, so that any misalignment between the position of the nest 14 on the conveyor 12 and the desired position of the nest 14 in the elevated work position can be automatically compensated for during the elevation of the nest 14. A pair of nest stops 132c (Fig. 2) also depend from the tool blocks 132a for engagement with a nest plate 72 at the top of the elevating stroke.

Female die operating mechanisms

Each of the oppositely disposed female die operating mechanisms 140 (Figs. 2, 8, 9, 10–16), has a plurality of (for example 3) apertured rods or female dies (152a, Figs. 9–11, 15; 152b, Fig. 12; 152c, Fig. 13; 152d, Figs. 14, 16); reciprocable on suitable bushings 154 (Fig. 2) within the bridge tool blocks 132a and a cover plate 155 (Fig. 2). A spring 156 on each of the female dies 152a—152d between the left hand bushing 154 (when viewed on Fig. 2) and a collar 158 on the left hand end of each of the female dies 152a—152d, resiliently urges each said die rod 152a—152d toward its normal position (Fig. 9) out of contact with a shell 20. A suitable yoke or bell crank lever 160 is pivoted on the adjacent mounting bracket 130. The lever 160 carries on its upper arm (Fig. 8) a plurality of three, one for each die 152a—152d, drive or operating pins 162 provided with a micrometer adjustment. The inner end of each drive pin 162 engages its associated registering female die, 152a—152d.

A link 164 (Fig. 8) connects the lower arm of each yoke 160 to one arm of a bell crank lever 166 on a stub or lever shaft 168 journalled in suitable bearings 169 provided in the bracket 116 (Fig. 7). The lower arm of the lever 166 carries a roller 170 engageable with a female die cam 172 on the main cam shaft 122. The springs 156 surrounding the die rods 152a—152d bias the rollers 170 against the cam 172 through the linkage 160—164—166.

Figures 9, 10, 11:
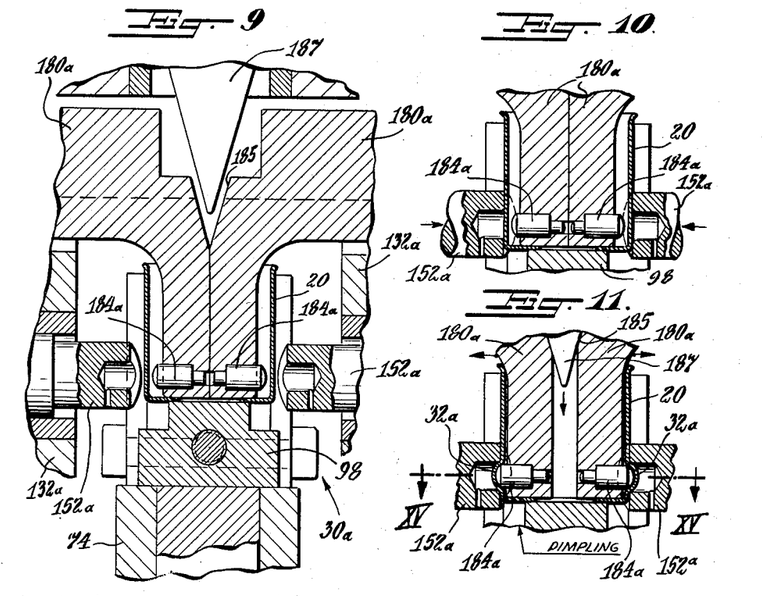
Fig. 9 is a fragmentary enlarged cross sectional view of the pin forming punch and die head or dimpling assembly of Fig. 2 and showing the base shell in pin forming position and the female dies and male punches in their retracted or starting positions.
Fig. 10 is a fragmentary view similar to Fig. 9 and showing the female dies in contact with the outside of the base shell.
Fig. 11 is a view similar to Fig. 10 and showing the position of the female dies, base shell and male punches at the end of the first pin forming or dimpling operation, at stations "6" and "27."

When the roller 170 rides up a raised portion of the cam 172, the right hand bell crank lever 166 (for example), when viewed in Fig. 8, moves clockwise, the link 164 moves upwardly; the yoke 160 moves clockwise; and the female dies 152a—152d move inwardly, as viewed in Fig. 10, against the base shell 20.

Male punch mechanisms

Each of the male punch operating mechanisms 150 at the pin forming stations (Figs. 2 and 9) have a pair of opposed matching generally L-shaped punch slides (180a, Figs. 9–11, 15; 180b, Fig. 12; 180c, Fig. 13; 180d, Figs. 14, 16) which are reciprocable in the bridge tool block 132a above the female die rods 150a—150d. The slides 180a—180d are biased into normally closed or matching engagement by a spring 182 (Fig. 2) held in the bridge tool block 132a between each of the slides 180a—180d and the bridge cover plate 155.

Each slide 180a–180d is provided with an upper wedge shaped cavity 185 and carries an associated male punch (184a, Figs. 9–11, 15; 184b, Fig. 12; 184c, Fig. 13; 184d, Figs. 14, 16) which register with the respective adjacent female die rod 152a—152d. Headed operating push-rods 186 (Fig. 2) having wedge shaped lower ends 187 are reciprocable in suitable bushings in central hub portions 188 of the bridge 132. A recovery spring 190 on each push-rod 186 between the headed end thereof and the hub portion 188 of the bridge 132 maintains each operating push-rod 186 in its normal "up" position, Fig. 9, out of contact with the respective slide 180a—180d.

A yoke 192 (Figs. 2 and 8) pivoted on the bridge 132 carries a plurality of three (in the showing of Fig. 8) drive or operating pins 194 provided with a micrometer adjustment. The pins 194 are in engagement with the headed ends of their respective operating push-rods 186. A link 196 (Figs. 2 and 8) connects the other arm of the yoke 192 to a bell crank lever 198 on the stub or lever shaft 168 contiguous to the main cam shaft 122. A roller 200 on the other arm of the bell crank lever 198 is maintained in constant engagement with a male punch cam 202 (Fig. 8) by the springs 190 on the operating push-rods 186 through the linkage 192, 196, 198.

When the roller 200 engages a raised portion of the cam 202, the bell crank lever 198, as viewed in Fig. 8, moves clockwise, the link 196 moves upwardly, the yoke 192 moves clockwise; the operating push-rods 186 move downwardly to cause the wedge-shaped lower portions 187 (Figs. 9 and 11) thereof to enter the wedge receiving apertures 185 in the slides 180a—180d. Depending on the depth of penetration of the wedges 187 therein (as determined by the cam 202, the male punches 184a— 184d are moved toward the base shells 20 secured in the nest 14 and perform their appointed pin forming task.

*Pin forming operation*

When a nest 14 indexes into either stations "6" or "27," the first pin forming or dimpling stations, the nest plate 72 of the nest 14 moves into the space between the plates 104 and the ledges 101 of the lifting head 102 of the nest lifting mechanism 40. The lifting cam 120 lifts the roller 118, the slide 114, and head 102, as well as the base shell nest 14 attached thereto, upwardly off the link guide pins 51 (Fig. 5) between the mounting brackets 130 (Fig. 2) from the dotted line position of Fig. 2 to the full line position shown therein. As shown in Fig. 9, the base shell 20 has been inserted between the female dies 152a and the male punches 184a of the male punch slides 180a.

The female die cam 172 moves the roller 170 outwardly, as viewed in Fig. 8, moving the lever 166 clockwise; the link 164 moves upwardly moving the yoke 160 clockwise and the female dies 152 inwardly against the outside of the base shell 20, as shown in Fig. 10.

The male punch cam 202 (Fig. 8) moves the roller 202 outwardly, moving the lever 198 clockwise; the link 196 moves upwardly; the yoke 192 moves clockwise, and the drive pins 194, the operating push-rods 186 and wedges 187 move downwardly separating the male punch slides 180. This separation first forces the male punches 184a (Fig. 11) against the inner surfaces of the base shells 20, and then forces the side wall of the base shells 20 outwardly into the female dies 152a to form the relatively flat (segmental spheroidal) filleted dimples 32a, shown in Fig. 11.

The male punch cam 202 of the male punch operating mechanism 150 and the female die cam 172 of the female die operating mechanism 140 may then simultaneously, or in sequential order, as desired, retract the male punches 182a and the female die rods 152a. The nest lifting mechanism 40 returns the nest 14 to the dotted position shown in Fig. 2. The conveyor 12 indexes, carrying the nest 14 out of the elevating mechanism 40 at either stations "6" or "27," the first pin forming or dimpling stations, over the guide plates 106 and 108 and into the lifting head 102 of the second pin forming or elongating station, either station "8" or "29."

Figure 13:
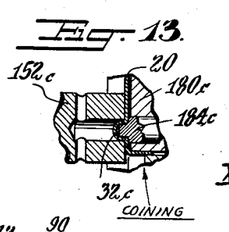
Fig. 13 is a view similar to Fig. 12 and showing one of the female dies, base shell and one of the male punches at the end of the third pin forming or coining operation at stations "10" and "31."

At stations "8" and "29" the above described nest elevating operation is repeated. Female dies 152b are moved forward against the relatively flat dimples 32a on the base shells 20 by the female die operating mechanism 140. Male punches 184b (Fig. 12), are moved against the inner surface of the relatively flat dimples 32a to force them into the female dies 152b and to form them into a deepened generally hemi-spherical dimples 32b (Fig. 13). Again the female dies 152b and male punches 184b are retracted. The nest 14 is lowered and then indexed to the third pin forming or coining station, either station "12" or "31."

After elevation of the nest 14 at the third pin forming or coining stations female dies 152c are moved against the dimples 32b. The male punches 184c (Fig. 13) form the dimples 32b into the generally cylindrical pins 32c (Fig. 13). When the nest 14 is lowered, the nest 14 indexes to the fourth pin forming or flattening station, either stations "12" or "33."

Figure 14:
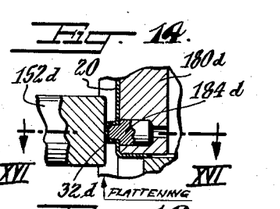
Fig. 14 is a view similar to Fig. 13 and showing one of the pin dies, base shell and one of the male punches at the end of the fourth pin forming operation, or pin flattening operation at stations "12" and "33."
Figure 15:
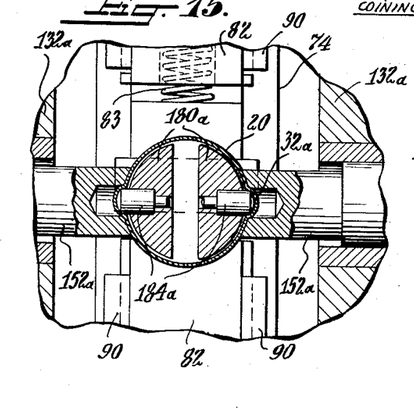
Fig. 15 is a fragmentary horizontal sectional view of the female die, base shell and male punch along the line XV—XV of Fig. 11 in the direction of the arrows.
Figure 16:
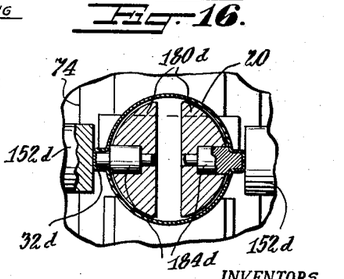
Fig. 16 is a view similar to Fig. 15 of the pin flattener, base shell, and male punch along the line XVI—XVI of Fig. 14 in the direction of the arrows.

At either station "12" or "33" the female dies 152d are desirably a solid rod or anvil without any forming cavity. The male punches 184d are desirably identical to male punches 184c and are inserted into the pins 32c before the dies 152d flatten the end portions of the pins 32c, thus giving said pins 32c the desired shape of pins 32d (Figs. 14 and 16).

Although a preferred embodiment of the invention has been disclosed, it will be understood that modifications may be made within the spirit and scope of the invention.

We claim:

1. A machine for forming a protuberance on a metallic part, comprising a frame, a movable member on said frame, a plurality of part-receiving nests on said movable member and movable by said movable member to a protuberance-forming station, nest-receiving means on said frame at the protuberance-forming station and operable to receive a nest, protuberance-forming means on the frame at the protuberance forming station and operable to form said protuberance on said part, and means on the frame at the protuberance-forming station and connected to the nest-receiving means for causing the nest-receiving means to remove said nest from said movable member and to position such nest and the part carried thereby adjacent said protuberance-forming means so that the latter may form the protuberance on said part.

2. A machine for forming a protuberance on a metallic part, comprising a frame, a movable member on said frame, guide members disposed on the movable member, a plurality of part-receiving nests on said guide members and movable by said movable member to a protuberance-forming station, nest-receiving means on said frame at the protuberance-forming station and operable to receive a nest, protuberance-forming means on the frame at the protuberance forming station and operable to form said protuberance on said part, alignment means disposed on the protuberance-forming means operable to align the nest for the protuberance-forming operation, and means on the frame at the protuberance-forming station and connected to the nest-receiving means for causing the nest-receiving means to remove said nest from said guide member, to move the nest into engagement with the alignment means and to position such nest and the part carried thereby adjacent said protuberance-forming means so that the latter may form the protuberance on said part.

3. A machine for forming a protuberance on a metallic part, comprising a frame, a movable member on said frame, a plurality of part-receiving nests on said movable member and movable by said movable member to a protuberance-forming station, nest-receiving means on said frame at the protuberance-forming station and operable to receive a nest, a female die on the frame at the protuberance-forming station, means connected to said female die for moving the latter into engagement with one side of the part, a male punch disposed on the frame in registry with the female die, means associated with such male punch for moving it into engagement with the other side of said part to deform the latter into a protuberance as defined by said female die, and means on the frame at the protuberance-forming station and connected to the nest-receiving means for causing the nest-receiving means to remove said nest from said movable member and to position such nest and the part carried thereby adjacent said protuberance-forming means so that the latter may form the protuberance on said part.

4. A machine for forming a protuberance on a metallic part, comprising a frame, a movable member on said frame, a plurality of part-receiving nests on said movable member and movable by said movable member successively to a plurality of forming stations, nest-receiving means on said frame at each of the forming stations and adapted to receive a nest, means on said frame at each of the forming stations and operable to incrementally form said protuberance on said part, and reciprocating means on the frame at each of the forming stations and connected to the nest-receiving means thereat for causing the nest-receiving means to remove said nest from said movable member and to position such nest and the part carried thereby adjacent the associated forming means so that the latter may form said part, said reciprocating means being further operable to return said nest and the part to the movable member after the forming operation, said forming means comprising a dimpling means at a first forming station for forming a segmental-spheroidal dimple in said part, and an elongating means at a second forming station for deepening and compressing the dimple on the part into a hemi-sperical shape to form the protuberance on the part.

5. A machine for forming a protuberance on a metallic part, comprising a frame, a movable member on said frame, a plurality of part-receiving nests on said movable member and movable by said movable member successively to a plurality of forming stations, nest-receiving means on said frame at each of the forming stations and adapted to receive a nest, means on said frame at each of the forming stations and operable to incrementally form said protuberance on said part, and reciprocating means on the frame at each of the forming stations and connected to the nest-receiving means thereat for causing the nest-receiving means to remove said nest from said movable member and to position such nest and the part carried thereby adjacent the associated forming means so that the latter may form said part, said reciprocating means being further operable to return said nest and the part to the movable member after the forming operation, said forming means comprising a dimpling means at a first forming station for forming a segmental-spheroidal dimple in said part, an elongating means at a second forming station for deepening and compressing the dimple on the part into a hemi-spherical shape, and a coining means at a third forming station for further deepening the elongated dimple into a generally cylindrical shape to form the protuberance on the part.

6. A machine for forming a protuberance on a metallic part, comprising a frame, a movable member on said frame, a plurality of part-receiving nests on said movable member and movable by said movable member successively to a plurality of forming stations, nest-receiving means on said frame at each of the forming stations and adapted to receive a nest, means on said frame at each of the forming stations and operable to incrementally form said protuberance on said part, and reciprocating means on the frame at each of the forming stations and connected to the nest-receiving means thereat for causing the nest-receiving means to remove said nest from said movable member and to position such nest and the part carried thereby adjacent the associated forming means so that the latter may form said part, said reciprocating means being further operable to return said nest and the part to the movable member after the forming operation, said forming means comprising a dimpling means at a first forming station for forming a segmental-spheroidal dimple in said part, an elongating means at a second forming station for deepening and compressing the dimple on the part into a hemispherical shape, a coining means at a third forming station for further deepening the elongated dimple into a generally cylindrical shape, and means at a fourth forming station for flattening the end of the coined elongated dimple to form the protuberance on the part.

7. A machine for forming a protuberance on a metallic part, comprising a frame, a movable member on said frame, guide means disposed on the movable member, a plurality of part-receiving nests on said guide means and movable by said movable member successively to a plurality of forming stations, nest-receiving means on said frame at each of the forming stations and adapted to receive a nest, means on said frame at each of the forming stations and operable to incrementally form said protuberance on said part, alignment means disposed on the forming means at each of the forming stations operable to align the nest for the forming operation, and reciprocating means on the frame at each of the forming stations and connected to the nest-receiving means thereat for causing the nest-receiving means to remove said nest from said guide means, to move the nest into engagement with the alignment means and to position such nest and the part carried thereby adjacent the associated forming means so that the latter may form said part, said reciprocating means being further operable to return said nest and the part to the movable member after the forming operation, said forming means comprising a dimpling means at a first forming station for forming a segmental-spheroidal dimple in said part, an elongating means at a second forming station for deepening and compressing the dimple on the part into a hemi-spherical shape, a coining means at a third forming station for further deepening the elongated dimple into a generally cylindrical shape, and means at a fourth forming station for flattening the end of the coined elongated dimple to form the protuberance on the part, each of said forming means comprising a female die on the frame at the forming station, means connected to said female die for moving the latter into engagement with one side of the part, a male punch disposed on the frame in registry with the female die, means associated with such male punch for moving it into engagement with the other side of said part to deform the latter into a shape as defined by said female die.

References Cited in the file of this patent

UNITED STATES PATENTS

| Number | Name | Date |
|---|---|---|
| 119,979 | Garrick | Oct. 17, 1871 |
| 431,435 | Butts | July 1, 1890 |
| 1,060,663 | Bauroth | May 6, 1913 |
| 1,239,177 | Granz | Sept. 4, 1917 |
| 1,625,854 | Holt | Apr. 26, 1927 |
| 2,251,434 | Weiss et al. | Aug. 5, 1941 |